United States Patent [19]

Corner et al.

[11] 4,351,382

[45] Sep. 28, 1982

[54] TIRE AND WHEEL RIM ASSEMBLIES

[75] Inventors: Michael R. Corner, Coventry; Ian Kemp, Tamworth; Tom French, Sutton Coldfield, all of England

[73] Assignee: Dunlop Limited, London, England

[21] Appl. No.: 212,143

[22] Filed: Dec. 2, 1980

[30] Foreign Application Priority Data

Dec. 6, 1979 [GB] United Kingdom ............... 7942181

[51] Int. Cl.³ .................... B60C 5/16; B60C 15/02
[52] U.S. Cl. .................... 152/330 RF; 152/362 R; 152/379.4; 152/381.4; 152/DIG. 9; 301/97; 301/98
[58] Field of Search ...... 152/362 R, 362 CS, 330 RF, 152/DIG. 9, 379.3, 379.4, 379.5, 381.3, 381.4, 381.5, 381.6, 386–387; 301/97, 98

[56] References Cited

U.S. PATENT DOCUMENTS

| 2,198,978 | 4/1940 | Sauer | 152/381.4 |
| 3,915,215 | 10/1975 | Nebout | 152/362 R |
| 4,148,348 | 4/1979 | French et al. | 152/379.1 |
| 4,151,870 | 5/1979 | Watts | 152/379.3 |
| 4,190,092 | 2/1980 | Evans et al. | 152/381.4 |

FOREIGN PATENT DOCUMENTS

| 593545 | 3/1960 | Canada | 152/381.3 |
| 2850973 | 5/1979 | Fed. Rep. of Germany | 152/362 R |
| 2008504 | 6/1974 | United Kingdom . | |
| 1480917 | 7/1977 | United Kingdom | 152/379.3 |
| 1485780 | 9/1977 | United Kingdom . | |
| 1320144 | 6/1978 | United Kingdom . | |
| 2010756 | 7/1979 | United Kingdom . | |

OTHER PUBLICATIONS

European Tire and Rim Technical Organization, Data Book 1972–1973, 1979, pp. 52–53 for 1972–1973 and pp. R16–R17 for 1979 book.

Primary Examiner—Edward C. Kimlin
Assistant Examiner—Lois E. Boland
Attorney, Agent, or Firm—Stevens, Davis, Miller & Mosher

[57] ABSTRACT

A tire and wheel rim assembly having improved bead retention characteristics when run deflated.

One or both bead seats is substantially straight and provided with an abutment respectively which is substantially continuous in the circumferential direction. Each abutment has a maximum radial dimension less than the minimum diameter of the tire bead reinforcement to allow fitment of the tire to a one-piece rim having a tire fitting well by conventional techniques. The taper of the bead seats is selected to enable abutments to be provided which have sufficient radial dimension or height relative to the adjacent bead seat such that under the action of road generated forces rotation of the tire beads about the adjacent abutment is effected to retain the tire beads at the bead seats.

37 Claims, 9 Drawing Figures

TIRE AND WHEEL RIM ASSEMBLIES

This invention concerns improvements in or relating to a pneumatic tire and wheel rim assembly and in particular to an assembly in which the tire beads are retained on their respective rim bead seats at inflation air pressures substantially lower than those normally required, for example in conditions where the tire is underinflated or punctured resulting in partial or total loss of the normal required air inflation pressure.

In a conventional pneumatic tire and wheel rim assembly the rim bead seats are tapered so that air inflation pressure forces the associated tire bead onto the taper and the tire beads are retained on the associated rim bead seat by the internal air pressure and by frictional restraint due to the compression of the elastomeric material of the tire bead below the inextensible bead reinforcement.

In service, steering forces and the consequential road generated forces are transmitted between the wheel rim and the tire by the aforedescribed engagement of the tire beads on the associated rim bead seats. Dislodgement of one or both of the tire beads from its associated rim bead seats reduces or prevents effective transmission of these forces with resultant loss of control of the vehicle and, in the case of well-based wheel rims complete separation of the tire from the wheel rim may occur resulting in contact of the wheel rim with the ground with potentially serious consequences to the vehicle and occupants.

Various test standards exist for tire and wheel rim assemblies. For example one standard test for automobile tires common to many countries requires that the tire is retained in position on the wheel rim while the vehicle is stopped in a straight line under controlled braking from a speed of 60 mph at which speed the tire is suddenly deflated. Another standard test relates to a tire bead unseating test carried out statically by means of applying a point load by an anvil to a point on the mid-sidewall of a tire and increasing the load until bead dislodgement occurs.

Neither test applies a dynamic side force condition which occurs in use of a vehicle when a steering force is applied, e.g. as when negotiating a bend or in an accident avoidance maneuvre or in the event of sudden loss of inflation pressure such as occurs following a blow-out.

The present applicants assignee has therefore previously carefully investigated the phenomenon of bead dislodgement by studying the behaviour of tire beads based on the performance of a tire and wheel rim assembly fitted as the outer front wheel, i.e. left hand or near side, in a righthand J-turn test. The test comprises straight running at a fixed speed and then the sudden application of full steering lock. The test which is now accepted as a standard by the European motor industry is repeated at progressively reducing air inflation pressures until bead dislodgement occurs. This test is considered to be more rigorous than the most severe conditions to which a tire and wheel rim assembly is likely to be submitted in service and therefore a more accurate reflection of the suitability of the assembly for service.

Based on the J-turn test applicant has found that cornering generates sideways forces which displace the tread laterally with respect to the rim, these forces being transmitted by the tire sidewalls to the tire beads resulting in the generation, in the region of the tire adjacent to the ground contact area, of axial forces (i.e. in the direction of the tire axis) and turning movements (i.e. about a circumferential line through the tire bead). The overall effect is understood to be initial rotation of the tire beads about their respective tire bead toes in the region of the ground contact area producing lifting of the tire bead heels thereby reducing the frictional force between the tire bead bases and their respective rim bead seats which initial rotation is accompanied by movement of the tire beads down the taper of their respective bead seats laterally inwardly of the adjacent wheel rim flange thereby reducing the tension in the associated tire bead reinforcements and hence the compression of the elastomeric material below the bead reinforcements. Usually the normal air inflation pressure alone is sufficient to retain the tire beads substantially in place on the taper of the associated bead seat. However, as the air inflation pressure is reduced the bead retaining forces due to the combination of the air inflation pressure and frictional restraint is lowered until they become less than the bead dislodgement forces and the tire beads leave their respective bead seats.

The present Applicants have found that when subjected to a 25 mph J-turn test the tire beads of conventional tire and wheel rim assemblies for passenger cars are dislodged at pressures of the order of 8-10 psi (normal air inflation pressures of the order of 25 psi) while bead dislodgement of assemblies for trucks when subjected to a 15 mph J-turn test occurs at pressures below 15 psi (normal air inflation pressures of the order of 100 psi). The lower test speed adopted for trucks as compared with cars is believed consistent with the much greater weight and hence larger forces to which assemblies fitted to trucks are subjected together with the lower average speed of trucks as compared with cars.

The foregoing investigation indicates the shortcomings of conventional tire and wheel rim assemblies at air inflation pressures below the recommended service pressures and despite numerous proposals to solve the problem of bead dislodgement none provided an assembly having the advantages of a one-piece wheel rim with a well to allow assembly and removal for repair or replacement using conventional techniques without additional components such as well-fillers, bead spacers etc. until the present Applicant's proposal, the subject of U.S. Pat. No. 4,148,348 (equivalent to U.K. Pat. No. 1,584,553), in which one or both of the tire beads is/are provided with a specially designed radially and axially extending toe which engages in a groove adjacent to the associated rim bead seat. The toe comes under increasing compression as the associated tire bead rotates due to the applied forces producing a reaction force which increases the tension in the bead reinforcement thereby overcoming the tendency for the tire bead to move down the taper of the associated bead seat.

It is an object of the present invention to provide a tire and wheel rim assembly having bead retention properties similar to those of U.S. Pat. No. 1,148,348 but which avoids the requirement of a specially designed toe on the tire bead and groove therefor in the wheel rim.

According to a first aspect of the present invention a pneumatic tire and wheel rim assembly comprises a tire having a tread portion connected at each edge to a respective one of a pair of sidewalls each terminating at its radially inner edge in an annular tire bead, each tire bead having a substantially inextensible bead reinforcement and a one-piece wheel rim having a tire fitting well between a pair of axially spaced bead seats on each of which a respective one of the tire beads is seated, each bead seat being tapered in an axially and radially outwards direction with respect to the rotational axis of the rim and terminating at its axially outer edge in a respective tire bead retaining flange, one of the bead seats being substantially straight and having adjacent to the axially inner edge thereof an abutment extending circumferentially around the bead seat, said abutment being substantially continuous and having a maximum diameter not greater than the minimum diameter of the bead reinforcement to allow fitment of the tire by passage of the associated tire bead outwards over the abutment and a generally radially extending axially outwardly directed abutment face to engage the associated tire bead toe, said abutment face having a maximum radial dimension with respect to the width and the taper angle of the adjacent bead seat such that under the action of road generated forces rotation of the tire bead about the abutment is effected to retain the tire bead at the bead seat.

Applicant is aware that it is well known in tire and wheel rim assemblies for cars to provide a continuous circumferential ridge, rib or hump adjacent to the axially inner edge of the rim bead seat. In order to allow fitment of the tire by passage of the inextensible tire bead axially outwards over the abutment on inflation such known abutments all have a maximum radial dimension no greater than 1.7 mm with respect to the adjacent rim bead seat for the standard 5° taper angle of car wheel rim bead seats. Applicant has determined that such combination at best improves the bead dislodgement performance in a J-turn test by 2 psi as compared with conventional assemblies i.e. dislodgement occurs at pressures of the order of 6–8 psi.

Applicant is further aware that it has been proposed e.g. U.K. Pat. Nos. 1,485,780 and 1,320,144 and published U.K. Patent Application 2010756A to provide one or more circumferentially extending ridges, ribs or humps, having a maximum radial dimension greater than the minimum radial dimension of the adjacent tire bead reinforcement. Applicant has found that such an arrangement, in which the abutment is not continuous about the bead seat in order to enable the tire to be fitted without damaging the inextensible tire bead, is no more effective in preventing bead dislodgement at air inflation pressures below the recommended service pressures than the known constructions having a continuous abutment of limited height in combination with a bead seat taper angle of 5°, the tire bead being dislodged when a portion of the rim in which the abutment is absent passes through the contact area by the same process which enabled the tire to be fitted.

Accordingly the term 'substantially continuous' as used herein in respect of the abutment is intended to include any discontinuity producing a reduction in the radial dimension of the abutment, partial or complete, which reduces the height of the abutment below that required to prevent bead dislodgement, which is of minimal dimension in the circumferential direction of the abutment and plays no part in the fitment of the tire and does not affect the bead retention capability of the abutment but specifically excludes discontinuities of the type disclosed in the prior art which are essential to enable the tire to be fitted to the rim.

The present invention centres on the realization that by selecting the taper angle of the rim bead seat for a particular width thereof an abutment of suitable radial dimension may be provided which enables the tire to be fitted to a one-piece wheel rim by conventional techniques but which engages the tire bead under the action of road generated forces to prevent dislodgement by a mechanism similar to that described in U.S. Pat. No. 1,148,348 without the requirements of a specially designed bead toe and wheel rim groove.

The tire bead toe may engage the abutment face when the tire is mounted on the rim and inflated to the recommended service pressure but more preferably the tire bead toe is spaced a small distance therefrom to facilitate fitment. As a result the tire bead toe engages the abutment face under the action of road generated side forces sufficient to cause initial rotation and movement of the bead down the taper of the bead seat, for example as may occur when the air inflation pressure is below the recommended service pressure.

Preferably the tire bead toe which engages the abutment face includes a relatively hard elastomeric material, for example elastomeric material having a hardness greater than 50 Shore A and and more preferably a hardness in the range 60 to 90 Shore A as measured under laboratory conditions, whereby the tire bead toe has substantial form or compression stiffness in a radially and axially directed plane containing the tip of the tire bead toe and the bead reinforcement.

Preferably the abutment includes means which allows air leakage in the event the tire beads of a tire fitted to the rim engages the abutment without seating on the rim bead seat. As a result the assembly will continuously lose air and the incorrect fitment will be apparent. The air relief means may comprise any one of several forms, for example one or more holes extending axially through the abutment or one or more grooves or projections extending across the radially outer surface of the abutment. The provision of holes is preferred as it does not produce any local variation in the radially outer surface of the abutment which may therefore be of uniform height around the bead seat. However, where the maximum abutment height to allow tire fitment and the rim abutment height to provide bead retention are different it is possible to use grooves or projections across the radially outer surface of the abutment while maintaining the overall height of the abutment at any circumferential point within such maximum and minimum limits.

In addition to air relief means in the abutment the tire may incorporate air relief means comprising one or more grooves or projections extending radially outwardly from the tire bead heel.

The abutment may be formed integrally with the wheel rim, for example, the rim may be formed by casting, rolling or may be formed separately and subsequently secured to the rim, for example by welding. It is possible therefore by the present invention to modify existing wheel rims by securing a suitably dimensioned abutment thereto.

Preferably the abutment face subtends an angle in the range 80° to 100° relative to the main rotational axis of the rim, and preferably an angle of substantially 90°.

Preferably the abutment includes a generally radially extending axially inwardly directed guide face to facilitate passage of the tire bead over the abutment during tire fitment. The guide face subtends a much lower angle relative to the main rotational axis of the rim than the abutment face, for example an angle in the range 30° to 60° may be used. The guide face may lead directly to the abutment face or there may be a flat ledge of substantially uniform diameter no greater than the maximum diameter of the abutment face therebetween.

Preferably the abutment has a maximum diameter not exceeding the effective diameter of the tire bead radially inwards of the inextensible bead reinforcement. As used herein the term 'effective diameter of the tire bead' is the maximum diameter of the radially inner surface of the tire bead during passage of the tire bead over the abutment measured at a point radially inwards of the minimum diameter of the bead reinforcement. It will be understood that this diameter is greater than the diameter of the same surface of the tire as moulded but is less than the minimum diameter of the bead reinforcement and depends on the material forming the bead which is subjected to compression forces during passage of the tire bead over the abutment.

Preferably the abutment face has a minimum height greater than or equal to 2.2 mm with respect to the adjacent bead seat and more preferably a height in the range 3 mm to 10.5 mm.

Preferably the bead seat provided with the abutment has a minimum taper angle greater than or equal to 7° and more preferably an angle in the range 10° to 20°.

It will be appreciated that for a given bead seat width the maximum abutment face height that will enable fitment of a tire and subsequent bead retention determines the minimum taper angle necessary.

The taper angle may be made greater than the minimum value determined by the particular bead seat width and maximum abutment face height without increasing the abutment face height thereby further facilitating tire fitment without significantly reducing the bead retention properties and enabling standardization of the bead seat taper for different rim sizes.

Where one abutment only is provided it is preferably on that bead seat which is axially outboard when the wheel rim is mounted on a vehicle. More preferably a respective abutment is provided on each bead seat. Where a respective abutment is provided on each bead seat the maximum radial dimension thereof relative to the adjacent bead seat may be the same or different. For example the height of the abutment on the inboard bead seat may be less than that of the abutment on the outboard bead seat.

The invention works for all tire constructions and is particularly suited to tubeless radial tires.

According to another aspect of the present invention a one-piece wheel rim comprises a tire fitting well between a pair of axially spaced annular bead seats, each bead seat being tapered in an axially and radially outwards direction with respect to the rotational axis of the rim and terminating at its axially outer edge in a respective tire bead retaining flange, one of the bead seats being substantially straight and having adjacent to the axially inner edge thereof an abutment extending circumferentially around the bead seat, said abutment being substantially continuous and having a maximum diameter such that a tire bead of a tire for which the rim is intended can pass over the abutment to seat on the adjacent bead seat and a generally radially extending and axially outwardly directed abutment face to engage the toe of a tire bead seated on the adjacent bead seat so that under the action of road generated side forces rotation of the tire bead about the abutment is effected to retain the tire bead at the bead seat.

The following Table indicates for varying rim sizes the maximum abutment heights which allow tire fitment for different bead seat taper angles.

| Nominal size (") | Bead seat diameter at the heel (mm) | Bead seat width (mm) | Abutment height (mm) | Taper angle (°) |
| --- | --- | --- | --- | --- |
| 10 | 253.2 | 15.7 | 2.2 | 7 |
|  |  |  | 3.3 | 10 |
|  |  |  | 4.5 | 15 |
|  |  |  | 6.0 | 20 |
| 13 | 329.4 | 19.8 | 2.7 | 7 |
|  |  |  | 3.8 | 10 |
|  |  |  | 5.6 | 15 |
|  |  |  | 7.5 | 20 |
| 22.5 | 571.5 | 38 | 4.9 | 7 |
|  |  |  | 7.0 | 10 |
|  |  |  | 10.5 | 15 |
|  |  |  | 14.1 | 20 |

The invention will now be described in more detail, by way of example only, with reference to the accompanying drawings wherein.

Figure 1:
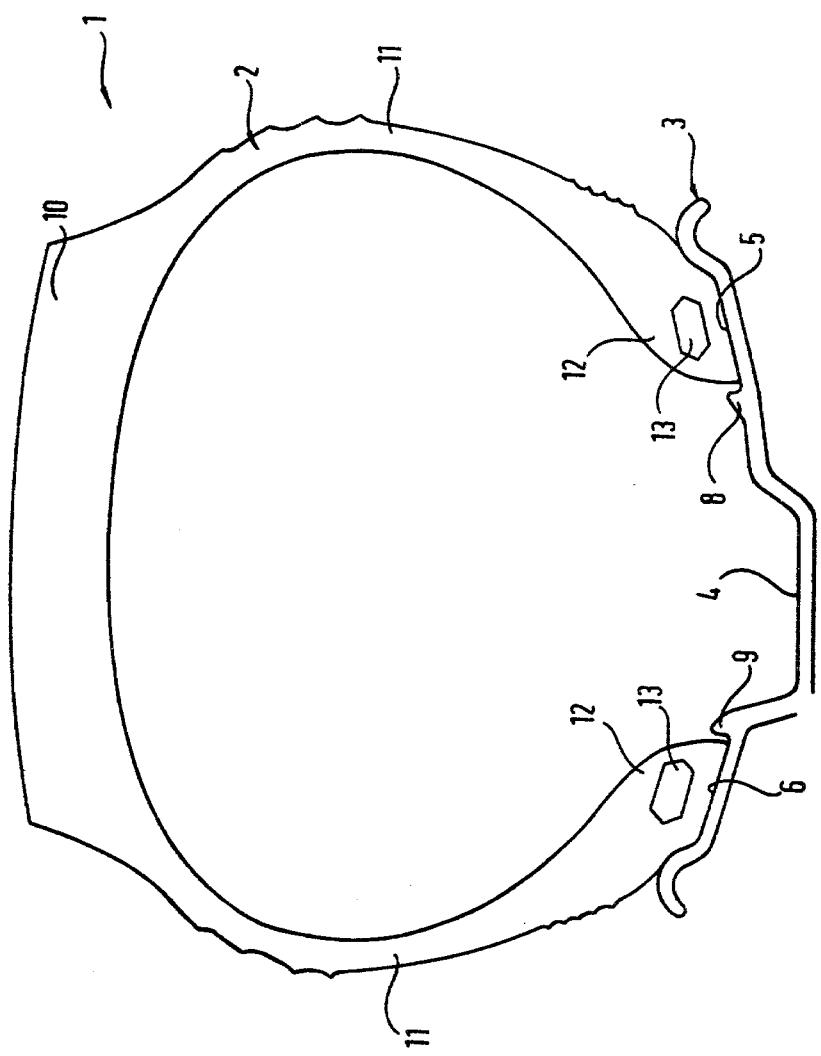
FIG. 1 shows a cross-sectional profile of a first embodiment of a tire and wheel rim assembly according to the present invention.

A first embodiment of a tire and wheel rim assembly 1 shown in FIG. 1 comprises an 11R 22.5 radial ply truck tire 2 with a steel breaker fitted to a 190.5 mm wide one-piece rim 3 having a bead seat diameter at the heel of 571.5 mm.

Figure 2:
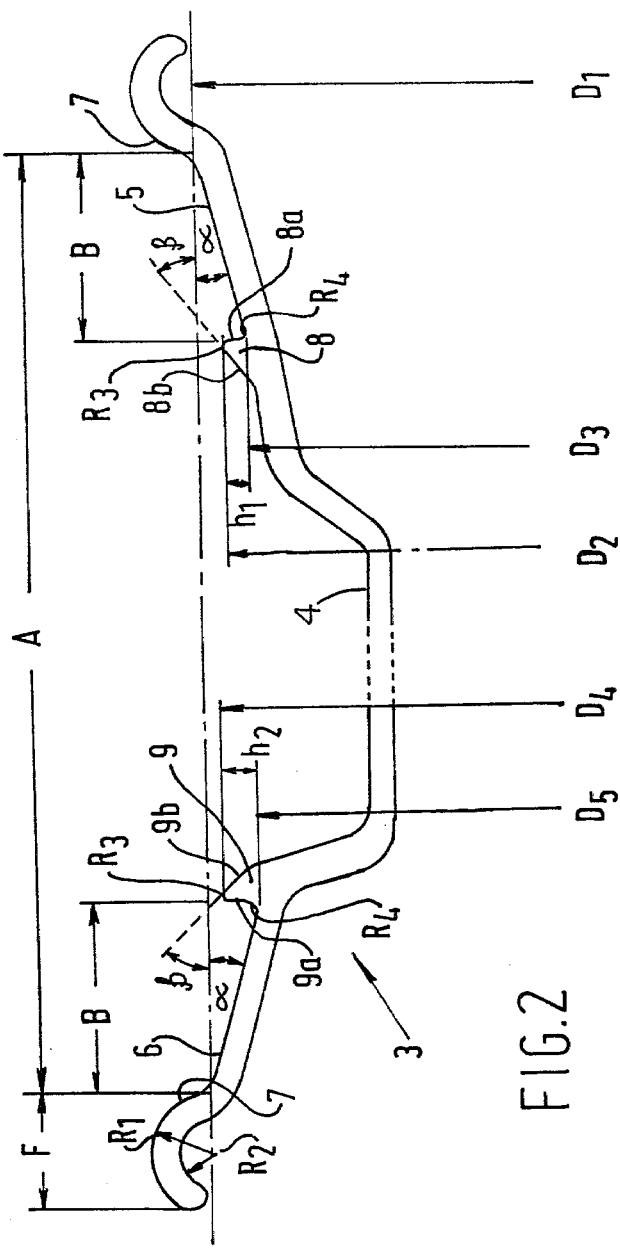
FIG. 2 shows in detailed cross-section to an enlarged scale, the wheel rim of the assembly shown in FIG. 1.

The wheel rim 3 shown in detail in FIG. 2 comprises a tire fitting well 4 between axially inboard and outboard annular bead seats 5 and 6 respectively each of which terminates at its axially outer edge in a respective bead retaining flange 7. Each bead seat 5 and 6 is straight and provided with a continuous abutment 8 and 9 respectively of uniform transverse cross-section extending circumferentially around the associated bead seat at a position adjacent to that at which the tire bead toe of a tire designed to fit on the rim seats.

Each abutment 8 and 9 comprises an axially outwardly directed abutment face 8a and 9a respectively extending substantially normal to the rotational axis of the rim and an inclined guide face 8b and 9b respectively extending at an angle β with respect to the rotational axis of the rim. As described in more detail later the abutment faces 8a and 9a engage the adjacent tire beads of a tire seated on the rim 2 to prevent bead dislodgement during deflated running and the guide faces 8b and 9b assist passage of the tire beads over the abutments during tire fitting.

The wheel rim dimensions applicable to FIG. 2 are as follows:

| | |
|---|---|
| A | 190.5 mm |
| B | 38 mm |
| $D_1$ | 571.5 mm |
| $D_2$ | 561.1 mm |
| $D_3$ | 551.1 mm |
| $h_1$ | 5 mm |
| $D_4$ | 565.1 mm |
| $D_5$ | 551.1 mm |
| $h_2$ | 7 mm |
| F | 24 mm |
| $R_1$ | 12.5 mm rad |
| $R_2$ | 5 mm rad |
| $R_3, R_4$ | 1.5 mm rad |
| $\alpha$ | 15° |
| $\beta$ | 40° |

The tire 2 comprises a tread portion 10 connected at each edge to a respective one of a pair of sidewalls 11 each of which terminates at its radially inner edge in an annular tire bead 12. Each tire bead is reinforced by an inextensible bead coil 13 comprising a plurality of rubber coated steel wires assembled to form a pack of hexagonal cross-section and an apex strip 14.

Figure 3:
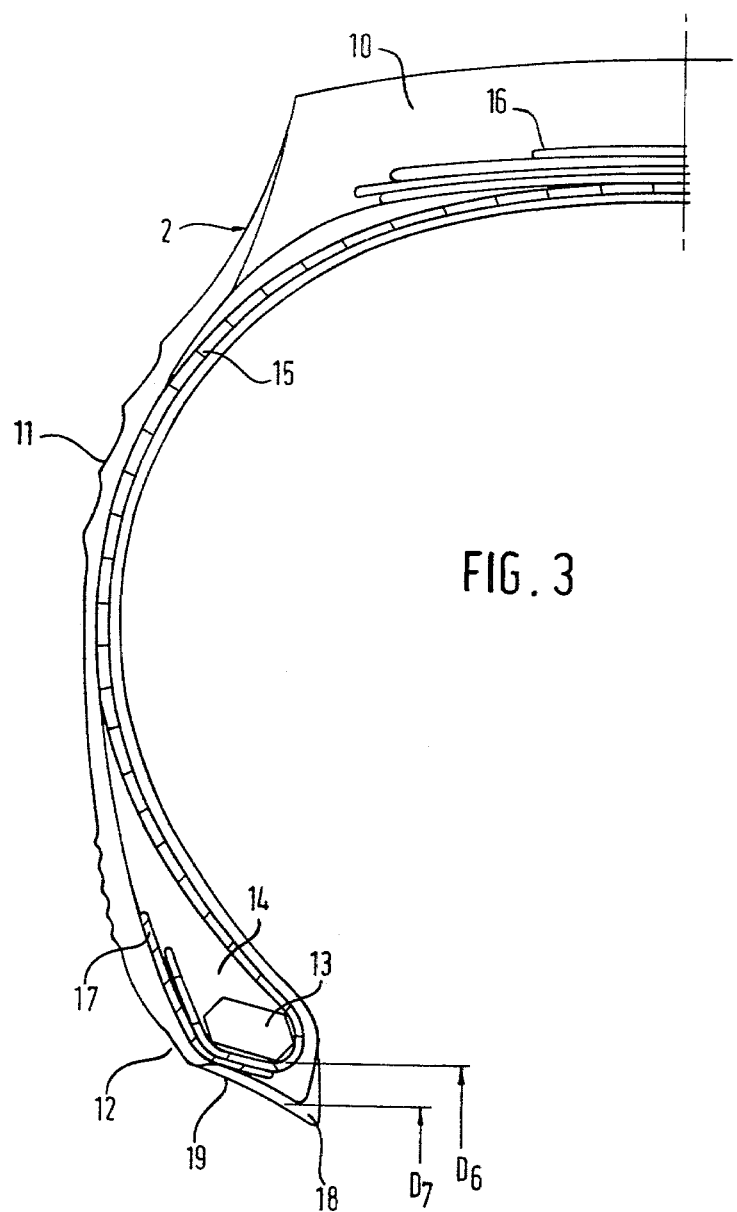
FIG. 3 shows in detailed half-section, to an enlarged scale, the tire of the assembly shown in FIG. 1.

As shown in more detail in FIG. 3 the tire has a single radial carcass ply 15 of steel the ends of which are turned up around the bead reinforcement and a breaker 16 comprising four cut-steel plies angled to either side of the mid-circumferential plane of the tire. A filler strip 17 is positioned in the outer part of each bead and extends radially outwards to overlap the carcass turn-up. The bead toe 18 is formed of rubber having a hardness of the order of 70 Shore A.

Each bead coil 13 has a minimum diameter ($D_6$) of 576 mm, the diameter ($D_7$) of the radially inner surface 19 of the tire bead below the minimum diameter of the bead coil is 554 mm (as moulded) 560 mm (as fitted) and the effective diameter of the tire bead as herein defined is $\geq 565.1$ mm.

The above described tire/wheel rim assembly is suitable for a vehicle having a tire load of 3 tons at 116 psi.

Figure 4:
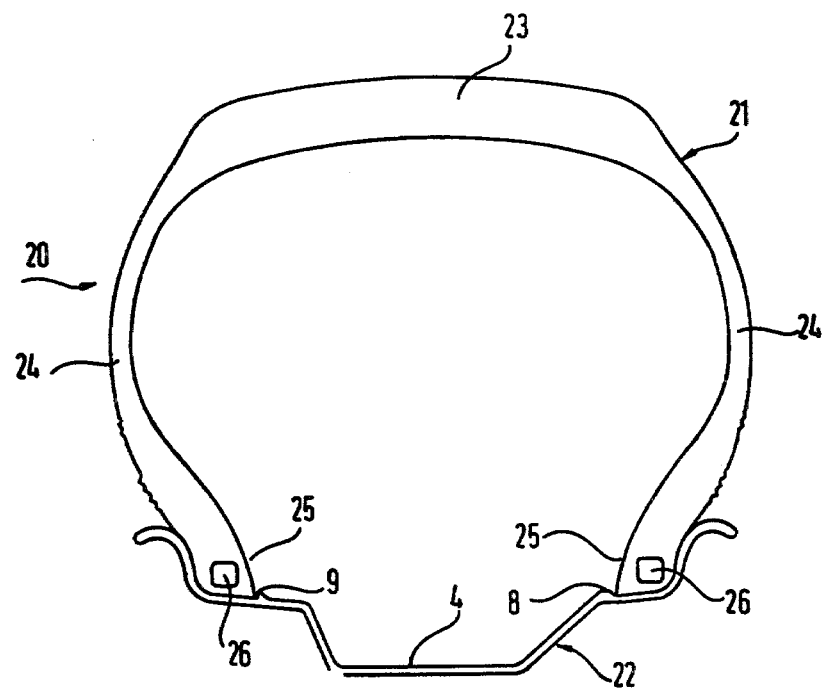
FIG. 4 shows a cross-sectional profile of a second embodiment of a tire and wheel rim assembly according to the present invention.

A second embodiment of a tire and wheel rim assembly 20 shown in FIG. 4 comprises a 155/R13 radial ply tire 21 with a steel breaker fitted to 114 mm wide wheel rim 22 having a bead seat diameter at the heel of 329.4 mm.

Figure 5:
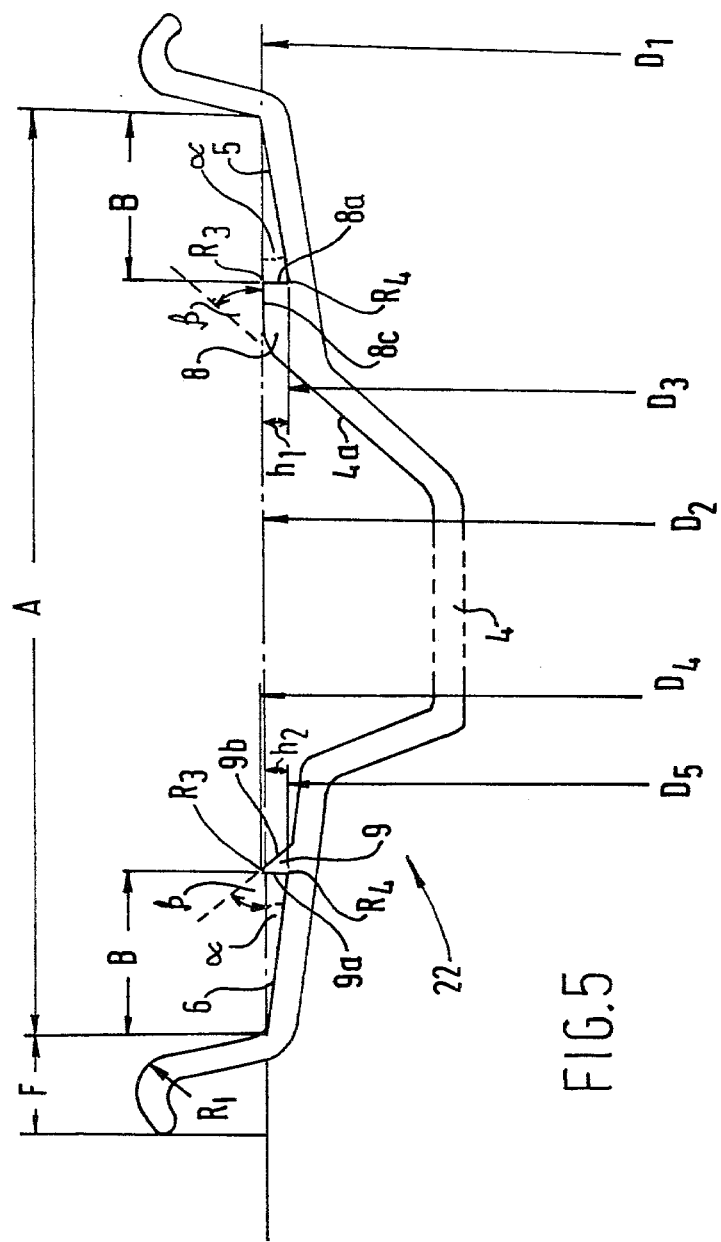
FIG. 5 shows in detailed cross-section, to an enlarged scale, the wheel rim of the assembly shown in FIG. 4.

The wheel rim 22 shown in detail in FIG. 5 is similar to that shown in FIG. 2 and like reference numerals are used to indicate corresponding parts.

The abutment 8 on the inboard bead seat 5 differs from that of the wheel rim shown in FIG. 2 in that the inclined guide face is formed by the radially outer portion of the adjacent side 4a of the tire fitting well 4 and is separated from the abutment face 8a by a flat ledge 8c of uniform diameter corresponding to the maximum radial dimension of the abutment 8.

The wheel rim dimensions applicable to FIG. 5 are as follows:

| | |
|---|---|
| A | 114 mm |
| B | 19.8 mm |
| $D_1$ | 329.4 mm |
| $D_2$ | 329.4 mm |
| $D_3$ | 322.4 mm |
| $h_1$ | 3.5 mm |
| $D_4$ | 330 mm |
| $D_5$ | 322.4 mm |
| $h_2$ | 3.8 mm |
| F | 15 mm |
| $R_1$ | 6.4 mm rad |
| $R_3, R_4$ | 1.5 mm rad |
| $\alpha$ | 10° |
| $\beta$ | 45° |

Figure 6:
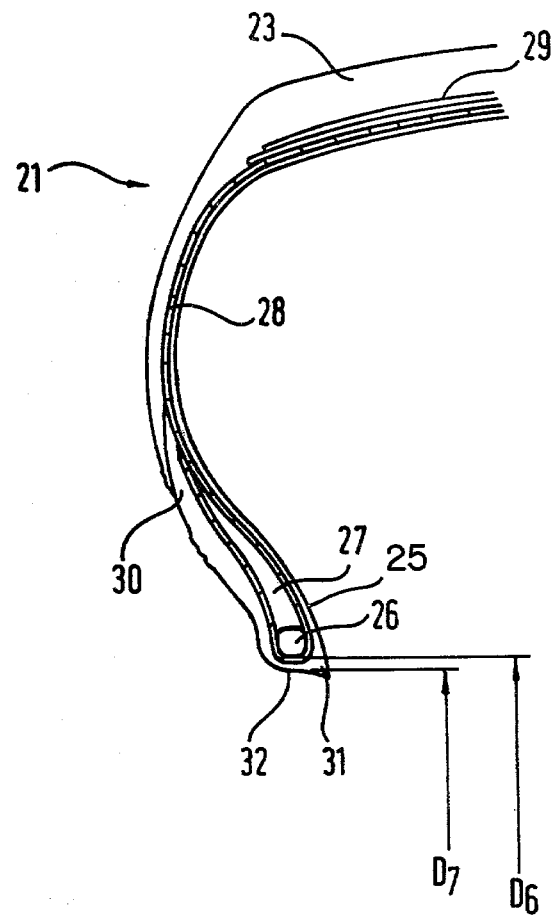
FIG. 6 shows in detailed half-section, to an enlarged scale, the tire of the assembly shown in FIG. 4.

The tire 21 of FIG. 6 comprises a tread portion 23 connected at each edge to a respective one of a pair of sidewalls 24 each of which terminates at its radially inner edge in an annular tire bead 25. Each tire bead is reinforced by an inextensible bead coil 26 comprising a plurality of rubber coated steel wires assembled to form a pack of square cross-section and an apex strip 27.

As shown in more detail in FIG. 6 the tire has a single radial carcass ply 28 of rayon the ends of which are turned up around the bead reinforcement and a breaker 29 comprising two cut-steel plies angled to either side of the mid-circumferential plane of the tire. A clinch strip 30 is positioned in the outer part of each bead and extends radially outwards to overlap the carcass turn-up. The bead toe 31 is formed by rubber having a hardness of the order of 70 Shore A.

Each bead coil 26 has a minimum diameter ($D_6$) of 335.9 mm, the diameter ($D_7$) of the radially inner surface 32 of the tire bead below the centre of the bead coil is 320 mm (as moulded), 326 mm (as fitted) and the effective diameter of the tire bead as herein defined is $\geq 330$ mm.

The above-described assembly is suitable for a tire load of 740 lbs at 24 psi.

The invention operates with different wheel rim constructions and tire sizes and applies also to other known tire constructions tubed or tubeless including radial ply tires, belted bias tires, cross-ply tires and run-flat 'Denovo' (Registered Trade Mark) type tires.

An abutment is preferably provided on each rim bead seat as described above although an abutment may be provided on one rim bead seat only, preferably that which is outboard in use.

OPERATION OF THE INVENTION

The operation of the invention will now be described with particular reference to the embodiment of FIGS. 1 to 3.

Figure 7:
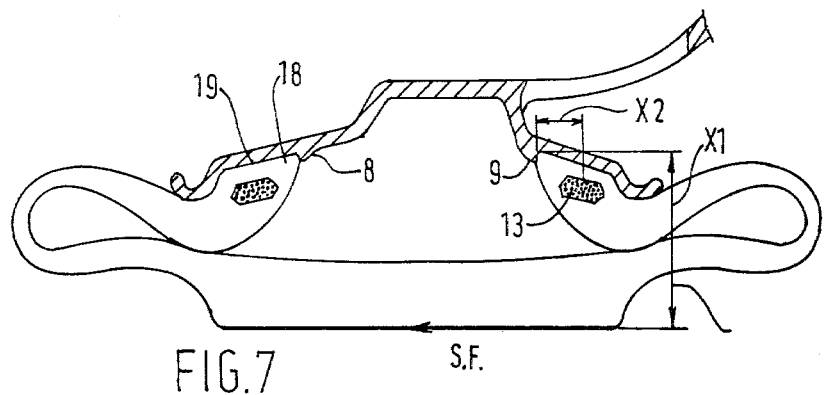
FIG. 7 shows in detailed cross-section, to an enlarged scale, the tire and wheel rim assembly of FIG. 1 in the ground-contacting area running deflated.

The recommended air inflation pressure for the truck tire assembly of FIG. 1 is 116 psi and for normal operation the tire beads 12 are retained on the respective rim bead seats 5,6 by the inflation pressure and the compression of the elastomeric material below the associated bead coil 13 by the bead coil tension force generated when the tire beads are fully seated on the rim bead seats 5,6. FIG. 7 shows the assembly of FIG. 1 in the tire/ground contact area for deflated operation i.e. zero inflation pressure, but with no side force applied.

In this condition the tire beads 12 are retained on the associated rim bead seats 5,6 by frictional grip of the material below the bead coil 13 due to the fitted bead coil tension $T_1$ (not shown), it being understood that there is no retention force due to air inflation pressure as the tire is being considered deflated.

Figure 8:
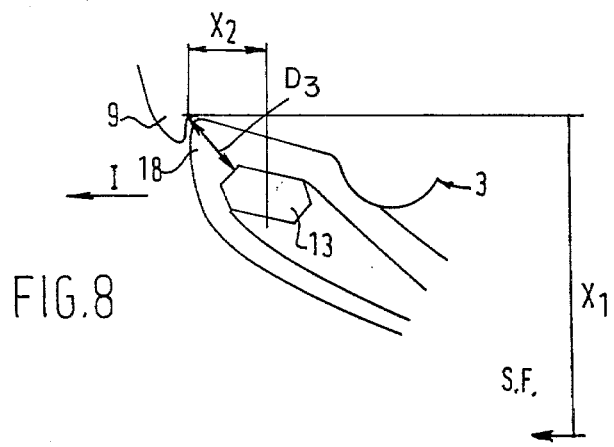
FIGS. 8 and 9 show in detailed cross-section, to an enlarged scale, the outboard bead seat and associated tire bead under an applied sideways force.
Figure 9:
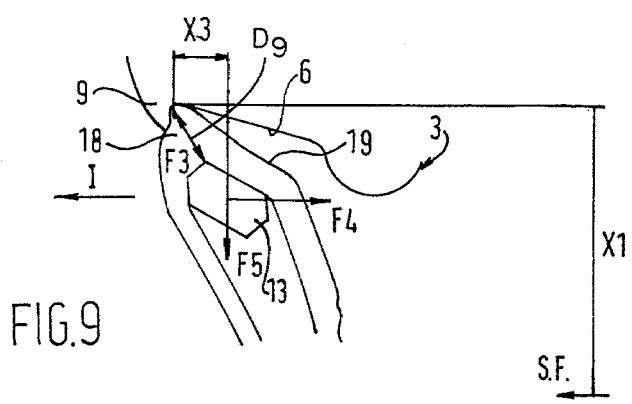

More particularly FIGS. 8 and 9 show to an enlarged scale the forces applied to the outboard rim bead seat/tire bead during a cornering or turning maneuvre. At the onset of such a maneuvre (FIG. 8) a side force SF is developed, increasing in intensity as the lateral acceleration increases. This side force distorts the tire sideways relative to the wheel rim and causes the outboard tire bead to rotate. The centre of rotation is the tip of the bead toe 18 and the dislodgement moment is $SF \times X_1$ where $X_1$ is the distance measured radially from the tread contact area to the centre of rotation. The tire bead 12 is retained against this rotation by the moment of the bead coil tension about the same centre of rotation which is $T_1 \times X_2$ where $X_2$ is the axial distance of the centre of the bead coil from the centre of rotation.

Increased side force generates an increased moment $SF \times X_1$ which initiates bead rotation when the retention moment $T_1 \times X_2$ is exceeded. As a result the bead coil 13 begins to move in the direction I inwardly of the wheel rim. The abutment 9 provided on the bead seat 6 in accordance with the present invention adjacent to the tip of the bead toe 18 engages the bead toe (FIG. 9) and prevents movement of the tire bead down the taper of the bead seat 6. The bead coil 13 is a substantially inextensible hoop around the wheel rim and thus cannot follow the required circular locus to rotate about the centre of rotation. Thus the bead coil 13 rotates and moves axially inwards to the position shown in FIG. 9. The toe 18 of the tire bead which in FIG. 8 has a length $D_3$ from the tip thereof to the bead coil as considered in a plane through the tip of the bead toe and the centre of the bead coil is therefore compressed to a shorter length $D_9$ as shown in FIG. 9. The toe 18 being made of rubber material having a hardness of 70 Shore A is substantially rigid and has considerable form or compression stiffness in the afore-mentioned plane through the tip of the bead toe and the centre of the bead coil. Consequently a resultant reaction force $F_3$ to rotation of the bead is generated by the bead toe against the bead coil. The force $F_3$ has an axially outward component $F_4$ and a radially outward component $F_5$. The component $F_5$ greatly increases the tension in the bead coil 13 and adds to the fitted tension $T_1$ an additional tension $T_2$ (not shown). Thus the initial retaining moment $T_1 \times X_2$ (FIG. 8) is increased to $(T_1 + T_2)X_3$ (FIG. 9) which equals or exceeds the dislodgement moment $SF \times X_1$. Rotation of the bead section about the centre of rotation therefore provides a balanced force condition and no further bead movement occurs.

The above-described force balance occurs in the ground contact area only where the high side force is in fact applied to the tire by the ground. However, the increased bead coil tension affects the complete hoop of the bead coil and tightens it onto the wheel rim. This increases the grip of the tire bead to the bead seat of the wheel rim.

Tire fitting to the wheel rim is conventional. The tire may be fitted over the bead retaining flanges 7 by hand tools, normal service equipment or automatic tire fitting machinery. Upon inflation the tire beads 12 having an effective diameter (as herein defined) greater than the diameter of the abutments 8,9 pass outwardly over the abutments 8,9 under the inflation pressure and seat on the respective bead seats 5,6. The toe 18 of each tire bead has a different taper angle to the heel in order to improve the seal on fitment and is able to flex on passing over the abutment and, when the bead 12 abuts the bead retaining flange 7 snaps down to seat on the bead seat adjacent to the abutment. To ensure correct fitting the straightened length of the tire bead base 19 measured from the heel point to the tip of the toe must not be greater than the distance measured from the heel point of the rim to the radially outermost point of the abutment. The angle subtended by the abutment face is therefore preferably greater than 90° for example 92° with respect to the rotational axis of the rim. However, the angle subtended may in certain cases be less than 90° so that the abutment defines a re-entrant portion with respect to the bead seat although this may require modification of the tire bead profile to suit.

Tire bead removal may be effected by applying a generally axially directed force to the tire adjacent to the bead retaining flange.

The tire/wheel rim assembly described above in relation to FIGS. 1 to 3 was tested as the outer front wheel of a Volvo F88 having a front axle load of 6 tons in a 15 m.p.h. J-turn test (i.e. straight ahead running at 15 m.p.h. followed by application of a full steering lock). The test was repeated while progressively reducing inflation pressures from 20 psi down to zero inflation pressure (valve core removed). Both tire beads were retained in position for each of the above tests.

In a similar test on a tire/wheel rim assembly using the same tire and a wheel rim having the same dimensions as the wheel rim of FIG. 2 but without the abutments 8,9 the outboard tire bead dislodged at an inflation pressure of 10 psi.

At lower inflation pressures the tire beads dislodged on straight ahead running before reaching a speed of 15 mph (i.e. before application of any side force).

The foregoing results show the significant improvement in bead retention obtained by the present invention thereby considerably reducing the safety hazard resulting from a sudden complete loss of inflation pressure during service.

The afore-described embodiments illustrate the manner in which the invention may be applied to a tire/wheel rim assembly suitable for trucks (FIGS. 1 to 3) without altering the taper angle of the wheel rim bead seats from the 15° value currently adopted by the major manufacturers in order to be able to provide an abutment of the required radial dimension relative to the adjacent bead seat which still enables the tire to be fitted to a one-piece rim using conventional techniques and provides the required bead retention. However, for application of the invention to tire/wheel rim assemblies suitable for cars (FIGS. 4 and 5) a bead seat taper angle substantially greater than the 5° value currently adopted as standard is required in order to be able to provide an abutment of the required radial dimension. Nevertheless by adopting a particular taper angle, for example 10°, it is possible to provide abutments for a range of wheel rim sizes which enable the tire to be fitted and which provide the required bead retention thus enabling standardization between the various rim sizes to be obtained.

The invention is not restricted to the above-described embodiments but is open to many modifications as follows. The abutments 8,9 may be provided with air relief means, for example one and preferably several circumferentially spaced axially extending grooves, humps or holes which allow air leakage in the event the bead toe seats on the top of the abutment during fitment. In these circumstances the assembly will continuously lose air and the incorrect fitment will be apparent. In addition the or each tire bead (12,25) which seats on a bead seat (5,6) having an abutment (8,9) may be formed with air leakage means comprising one or more recesses in or projections on the axially outer surface of the bead, the recesses or projections extending radially outwards from the bead heel to a part beyond the bead retaining flange 7. Although the modification to the wheel rim enables standard type tires to be fitted and retained on the rim as described above the tires may be of modified construction in particular in the bead region to improve the compression or form stiffness of the bead toe and hence the operation of the invention. Thus the bead toe may include reinforcement in the form of fabric layer(s) or discontinuous fibres or simply may be formed from rubber having a hardness greater than the rubber compounds commonly used in this region, for example rubber having a hardness of the order of 80-90 Shore A.

The tires 2 and 21 may have a lubricant/sealant material coated on the inner surface of the tire in the region of the tire crown to provide run-flat capability, the coating material preferably including a sealant to reseal a puncture and a lubricant to avoid internal damage and reduce heat build-up when running flat. Further details of a suitable coating are given in our U.K Pat. No. 1,570,397.

Having now described our invention what we claim is:

1. A tire and wheel rim assembly comprising a tire having a tread portion connected at each edge to a respective one of a pair of sidewalls each terminating at its radially inner edge in an annular tire bead, each tire bead having a substantially inextensible bead reinforcement and a one-piece wheel rim having a tire fitting well between a pair of axially spaced bead seats on each of which a respective one of said tire beads is seated, each bead seat being tapered at an angle of about 5° in an axially and radially outwards direction with respect to the rotational axis of said rim and terminating at its radially outer edge in a respective tire bead retaining flange, one of said bead seats being substantially straight and having adjacent to the axially inner edge thereof an abutment extending circumferentially around said bead seat, said abutment being substantially continuous and having a height of at least 2.2 mm and a maximum diameter not greater than the minimum diameter of said bead reinforcement to allow fitment of said tire by passage of the associated tire bead outwards over said abutment and a generally radially extending axially outwardly directed abutment face to engage the toe of said associated tire bead, said abutment face having a maximum radial dimension with respect to the width and the taper angle of the adjacent bead seat such that under the action of road generated forces rotation of said tire bead about said abutment is effected to retain said tire bead at said bead seat.

2. An assembly according to claim 1 wherein said tire bead toe rests against said abutment face when the assembly is inflated to the recommended service pressure.

3. An assembly according to claim 1 wherein said tire bead toe is adjacent to but slightly spaced from said abutment face when the assembly is inflated to the recommended service pressure.

4. An assembly according to claim 1 wherein said tire bead toe has substantial form or compression stiffness in a plane containing the tip of said toe and the centre of said bead reinforcement.

5. An assembly according to claim 4 wherein said tire bead toe which engages the abutment face includes an elastomeric material having a hardness greater than 50 Shore A.

6. An assembly according to claim 5 wherein said elastomeric material has a hardness in the range 60 to 90 Shore A.

7. An assembly according to claim 1 wherein said abutment is continuous and of uniform height around the entire bead seat.

8. An assembly according to claim 7 wherein said abutment is of uniform transverse cross-section.

9. An assembly according to claim 1 wherein said abutment includes air relief means.

10. An assembly according to claim 9 wherein said air relief means comprises a groove extending axially across the radially outer surface of said abutment.

11. An assembly according to claim 10 including a plurality of circumferentially spaced grooves.

12. An assembly according to claim 9 wherein said air relief means comprises a hole located in and extending axially through the radial extent of said abutment.

13. An assembly according to claim 12 including a plurality of circumferentially spaced holes.

14. An assembly according to claim 9 wherein said air relief means comprises a projection extending axially across the radially outer surface of said abutment.

15. An assembly according to claim 14 including a plurality of circumferentially spaced projections.

16. An assembly according to claim 1 wherein said tire includes air leakage means comprising one or more recesses in or projections on the axially outer surface of said bead which seats on said bead seat having said abutment, said recesses or projections extending radially outwardly from the bead heel to a point beyond said bead retaining flange.

17. An assembly according to claim 1 wherein said abutment is formed integrally with said wheel rim.

18. An assembly according to claim 1 wherein said abutment is formed separately from said wheel rim and subsequently secured thereto prior to fitment of said tire.

19. An assembly according to claim 1 wherein said abutment face subtends an angle in the range 80° to 100° relative to the rotational axis of the rim.

20. An assembly according to claim 19 wherein said abutment face subtends an angle of substantially 90°.

21. An assembly according to claim 1 wherein said abutment includes a generally radially extending axially inwardly directed guide face.

22. An assembly according to claim 21 wherein said guide face subtends an angle in the range 30° to 60° relative to the rotational axis of said tire.

23. An assembly according to claim 21 wherein said abutment includes a generally axially extending flat ledge between said abutment face and guide face.

24. An assembly according to claim 1 wherein said abutment has a maximum diameter not exceeding the effective diameter of said tire bead as herein defined.

25. An assembly according to claim 1 wherein said abutment face has a height in the range 3 mm to 10.5 mm.

26. An assembly according to claim 1 wherein said bead seat provided with said abutment has a minimum taper angle of 7° with respect to the rotational axis of said rim.

27. An assembly according to claim 26 wherein said bead seat has a taper angle in the range 10° to 20°.

28. An assembly according to claim 1 wherein said abutment is provided on the outboard bead seat.

29. An assembly according to claim 1 wherein a respective abutment is provided on each bead seat.

30. An assembly according to claim 29 wherein the abutment faces of said abutments are of similar height.

31. An assembly according to claim 29 wherein the abutment face of the abutment on the outboard bead seat has a height greater than the abutment face of the abutment on the inboard bead seat.

32. An assembly according to claim 1 wherein said tire is a radial tire.

33. An assembly according to claim 1 wherein said tire is a cross-ply tire.

34. An assembly according to claim 1 wherein said tire is a belted bias tire.

35. A one piece wheel rim comprising a tire fitting well between a pair of axially spaced annular bead seats, each bead seat being tapered in an axially and radially outwards direction with respect to the rotational axis of said rim and terminating at its axially outer edge in a respective tire bead retaining flange, one of said bead seats being substantially straight and having adjacent to the axially inner edge thereof an abutment extending circumferentially around said bead seat, said abutment being substantially continuous and having a height of at least 2.2 mm and a maximum diameter such that a tire bead of a tire for which the rim is intended can pass over said abutment to seat on said adjacent bead seat and a generally radially extending and axially outwardly directed abutment face to engage the toe of a tire bead seated on said adjacent bead seat so that under the action of road generated side forces rotation of said tire bead about said abutment is effected to retain the tire bead at said bead seat.

36. A tire wheel rim assembly capable of operation in a substantially deflated condition without the tire being dislodged from its position on the rim comprising:
(a) a one-piece wheel rim having in cross-section a pair of radially outwardly extending flanges, a pair of bead seats immediately adjacent the flanges, each bead seat being tapered at an angle of about 10° in an axially and radially outwards direction with respect to the rotational axis of the rim and a radially inwardly extending open well located between said bead seats so that a tire can be mounted on the rim by use of the well,
(b) a tire mounted on said rim and defining therewith a chamber for inflation, said tire having a tread portion connected at each edge to a respective one of a pair of sidewalls each terminating in a respective annular tire bead fitting upon an associated rim bead seat, each tire bead having a substantially inextensible annular bead reinforcement embedded therein,
(c) means on said rim to prevent at least one of the tire beads from being dislodged from its associated rim bead seat into the open well under the action of road generated forces with the tire in a deflated condition but permitting the tire to be mounted on the rim bead seats by inflation pressure and demounted therefrom by exerting an axially directed force against the tire bead, said means comprising a substantially continuous circumferential abutment on the rim in the area between said open well and the toe of said tire bead fitted on its associated bead seat, said abutment having a height of at least 3 mm and a maximum diameter not greater than the minimum diameter of the bead reinforcement of said tire bead and a generally radially extending axially outwardly directed abutment face, said rim bead seat being substantially straight in the area between the adjacent rim flange and said abutment and said abutment face having a radial dimension with respect to the width and taper angle of said bead seat such that when an axially inwardly directed force at said tread portion is applied to said tire bead by the tire sidewall in the ground contacting portion of the tire circumference, engagement of the toe of said tire bead with said abutment face generates at the bead reinforcement a substantial radially and axially outwardly directed force at the bead reinforcement, tightening the bead reinforcement and retaining said tire bead at its bead seat.

37. A tire and wheel rim assembly capable of operation in a substantially deflated condition without the tire being dislodged from its position on the rim comprising:
(a) a one-piece wheel rim having in cross-section a pair of radially outwardly extending flanges, a pair of bead seats immediately adjacent the flanges, each bead seat being tapered in an axially and radially outwards direction with respect to the rotational axis of the rim and a radially inwardly extending open well located between said bead seats so that a tire can be mounted on the rim by use of the well,
(b) a tire mounted on said rim and defining therewith a chamber for inflation, said tire having a tread portion connected at each edge to a respective one of a pair of sidewalls each terminating in a respective annular tire bead fitted upon an associated rim bead seat, each tire bead having a substantially inextensible annular bead reinforcement embedded therein,
(c) means on said rim to prevent at least one of the tire beads from being dislodged from its associated rim bead seat into the open well under the action of road generated forces with the tire in a deflated condition but permitting the tire to be mounted on the rim bead seats by inflation pressure and demounted therefrom by exerting an axially directed force against the tire bead, said means comprising a substantially continuous circumferential abutment on the rim in the area between said open well and the toe of said tire bead fitted on its associated bead seat, said abutment having a height of at least 2.2 mm and a maximum diameter not greater than the minimum diameter of the bead reinforcement of said tire bead and a generally radially extending axially outwardly directed abutment face, said rim bead seat being substantially straight in the area between the adjacent rim flange and said abutment and, the toe of said tire bead being of a hardness of at least 60 Shore A and having sufficient form integrity in a plane through the tip of said toe and the center of the beads reinforcement such that when an axially inwardly directed force at said tread portion is applied to said tire bead by the tire sidewall in the ground contacting portion of the tire circumference, engagement of the toe of said tire bead with said abutment face generates at the bead reinforcement a substantial force acting in said plane to tighten the bead reinforcement and retain said tire bead at its bead seat.

* * * * *